(12) United States Patent
Lawson et al.

(10) Patent No.: US 9,600,159 B2
(45) Date of Patent: Mar. 21, 2017

(54) SCROLLABLE DESKTOP NAVIGATION

(75) Inventors: Richard James Lawson, Santa Clara, CA (US); Chandar Kumar Oddiraju, Santa Clara, CA (US); Marguerite Letulle, San Mateo, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 102 days.

(21) Appl. No.: 14/347,313

(22) PCT Filed: Jan. 30, 2012

(86) PCT No.: PCT/US2012/023078
§ 371 (c)(1),
(2), (4) Date: Mar. 26, 2014

(87) PCT Pub. No.: WO2013/115764
PCT Pub. Date: Aug. 8, 2013

(65) Prior Publication Data
US 2014/0333674 A1  Nov. 13, 2014

(51) Int. Cl.
| | | |
|---|---|---|
| *G06F 3/0485* | (2013.01) |
| *G06F 3/0484* | (2013.01) |
| *G09G 5/42* | (2006.01) |
| *G06F 3/0488* | (2013.01) |
| *G06F 3/0481* | (2013.01) |
| *G09G 5/14* | (2006.01) |
| *G09G 5/34* | (2006.01) |

(52) U.S. Cl.
CPC ........ *G06F 3/04845* (2013.01); *G06F 3/0481* (2013.01); *G06F 3/0485* (2013.01); *G06F 3/04883* (2013.01); *G09G 5/42* (2013.01); *G06F 2203/04803* (2013.01); *G09G 5/14* (2013.01); *G09G 5/346* (2013.01)

(58) Field of Classification Search
CPC .. G06F 3/0485; G06F 3/0481; G06F 3/04855; G06F 2203/04803; G06F 1/1692; G09G 5/14; G09G 5/34
See application file for complete search history.

(56) References Cited

U.S. PATENT DOCUMENTS 7,561,157 B2  7/2009 Fagans
8,024,658 B1  9/2011 Fagans
(Continued)

FOREIGN PATENT DOCUMENTS

AU  2011101581  1/2012

OTHER PUBLICATIONS

"Useful Programs—360 Desktop" Date: 2009.
(Continued)

*Primary Examiner* — Jacinta M Crawford
*Assistant Examiner* — Diane Wills
(74) *Attorney, Agent, or Firm* — HP Inc. Patent Department

(57) ABSTRACT

Embodiments disclosed herein relate to navigation of a scrollable desktop. In one embodiment, a user interface includes a scrollable desktop portion and a navigation portion. The scrollable desktop portion may display open applications, and the navigation portion may display representations of the open applications on the scrollable desktop with the relative position of the open applications on the scrollable desktop.

17 Claims, 9 Drawing Sheets

(56) References Cited

U.S. PATENT DOCUMENTS

| | | | |
|---|---|---|---|
| 2006/0071942 A1* | 4/2006 | Ubillos | G06F 3/0483 345/619 |
| 2006/0119619 A1 | 6/2006 | Fagans et al. | |
| 2007/0150810 A1* | 6/2007 | Katz | G06F 3/0481 715/229 |
| 2008/0222558 A1* | 9/2008 | Cho | G06F 3/0485 715/784 |
| 2010/0223574 A1 | 9/2010 | Wang et al. | |
| 2012/0169623 A1* | 7/2012 | Grossman | G06F 3/0416 345/173 |
| 2012/0266104 A1* | 10/2012 | Shah | 715/784 |

OTHER PUBLICATIONS

Dell Computers~"Understanding Your Dell Streak"~www.dell.com/support/Manuals~2013~2 pages.
Gi Me Space~"Screen Shots" http://sites.google.com~2013~4 pages.

\* cited by examiner

SCROLLABLE DESKTOP NAVIGATION

BACKGROUND

An electronic device may include a desktop user interface. The desktop user interface may show open applications and in some cases shortcut icons for accessing additional applications. The desktop user interface may allow a user to easily access multiple open applications.

BRIEF DESCRIPTION OF THE DRAWINGS

The drawings describe example embodiments. The following detailed description references the drawings, wherein.

DETAILED DESCRIPTION

A scrollable desktop interface may allow multiple open applications on an electronic device such that some open applications are out of view, and a user may scroll to them. For example, the scrollable desktop may appear to be an infinite desktop where a portion of the desktop is in view at a given time. A scrollable desktop interface may allow a user to keep more applications accessible than a tab based application access configuration limited to the length or width of the display screen space.

In one implementation, a navigation portion of a desktop user interface provides a key for navigating a scrollable desktop. For example, the navigation portion may be a non-scrollable version of the scrollable desktop showing the scrollable desktop as if it were a circular desktop unwrapped. In some implementations, the scrollable desktop is an infinite desktop from left to right that does not allow for a circular navigation where the two sides are connected, and the navigation portion may show the scrollable desktop portions that are both in view and portions that are out of view to the left and right of the in view portion. The open applications on the scrollable desktop may appear as miniature representations on the navigation key. The navigation key may include the open applications in a manner that makes them appear in the same way as on the scrollable desktop as a smaller version. For example, the navigation key may preserve the relative size of the open applications and the relative distance between them.

The navigation portion may include a selection object showing the portion of the scrollable desktop in the current view on a display device to allow a user to orient the position on the navigation portion. For example, the selection object may provide an outline over the portion of the navigation key in the current view of the scrollable desktop. In some cases, a portion of an open application may be in view and a portion of the open application may be out of view depending on the current position of the scrollable desktop, such as where a user has scrolled to a position where an open application is on the edge of the current view.

The navigation key may provide a better user experience with an electronic device. A navigation key may allow for a scrollable desktop for accessing more open applications while maintaining a sense of position on the scrollable desktop and providing information about the contents of the scrollable desktop out of view.

Figure 1:
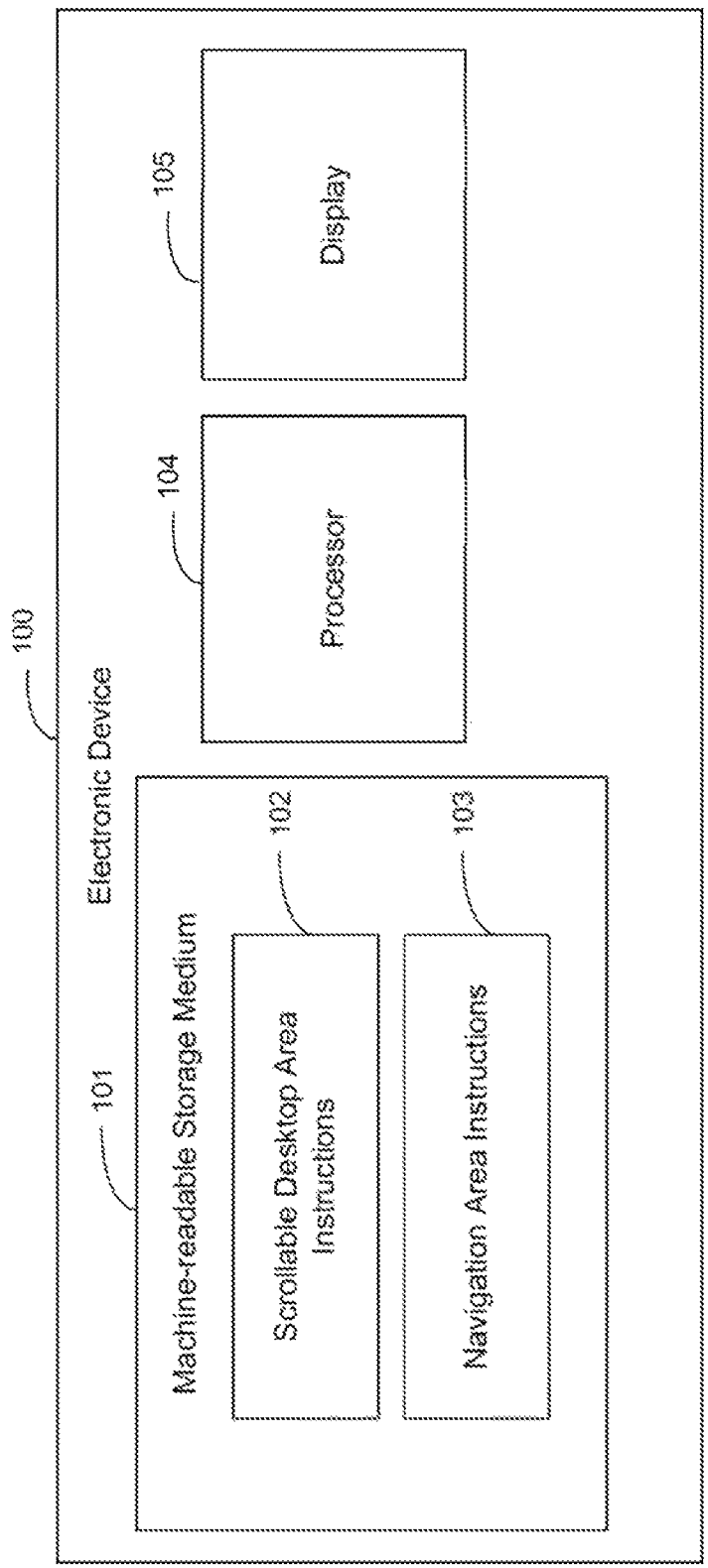
FIG. 1 is a block diagram illustrating one example of an electronic device.

FIG. 1 is a block diagram illustrating one example of an electronic device 100. The electronic device 100 may be, for example, a desktop, laptop, slate, or mobile computing device. The electronic device 100 may include a machine-readable storage medium 101, a processor 104, and a display 105. The display 105 may be, for example, a display that is part of the electronic device 100, such as a mobile phone or tablet computer screen, or a separate display device connected to the electronic device 100, such as a monitor connected to a desktop computer. The display 105 may display information to a user interacting with the electronic device 100. For example, the display 105 may display a user interface, such as a desktop user interface, for allowing a user to access applications for use.

The processor 104 may be any suitable processor, such as a central processing unit (CPU), a semiconductor-based microprocessor, or any other device suitable for retrieval and execution of instructions. In one implementation, the electronic device 100 includes logic instead of or in addition to the processor 104. As an alternative or in addition to fetching, decoding, and executing instructions, the processor 104 may include one or more integrated circuits (ICs) (e.g., an application specific integrated circuit (ASIC)) or other electronic circuits that comprise a plurality of electronic components for performing the functionality described below. In one implementation, the electronic device 100 includes multiple processors. For example, one processor may perform some functionality and another processor may perform other functionality described below.

The machine-readable storage medium 101 may be any suitable machine readable medium, such as an electronic, magnetic, optical, or other physical storage device that stores executable instructions or other data (e.g., a hard disk drive, random access memory, flash memory, etc). The machine-readable storage medium 101 may be, for example, a computer readable non-transitory medium. The machine-readable storage medium 101 may include instructions executable by the processor 104. The machine-readable storage medium 101 may include instructions to be executed by the processor 104 to create a desktop user interface to be displayed on the display device 105 for allowing a user to access applications for use. The processor 104 may execute instructions to cause the created user interface to be displayed.

The machine-readable storage medium 101 may include scrollable desktop area instructions 102 and navigation area instructions 103 executable by the processor 104. The scrollable desktop area instructions 102 may be instructions to create a scrollable desktop. The scrollable desktop may include multiple applications where some are in view and others are out of view. The user may scroll across the scrollable desktop to move the desktop position to bring other open applications in view. For example, a user may have a desktop with an image editing application and word processing application in view, and a video application may be out of view such that a user may scroll to view it. The scrollable desktop may preserve characteristics of the open applications that are out of view. For example, the size of the open applications and distance between them may be set by the user and preserved whether or not a particular open application is in or out of view.

The navigation area instructions 103 may be instructions to create a navigation area of the desktop. The navigation area may provide a view of the complete scrollable desktop as if it were stretched out. The navigation area may provide a smaller version for allowing a user to view the current view of the scrollable desktop in context of the scrollable desktop as a whole. For example, the navigation area may show both areas of the scrollable desktop in the current view and areas of the scrollable desktop out of the current view. The navigation area may make the user aware of the open applications and their position on the scrollable desktop, allowing a user to know now to scroll to the other applications. The navigation area may also show the relative size of the open applications and the relative distance between them.

In one implementation, the navigation area includes a selection area to show which portion of the scrollable desktop is currently in view. The selection area may outline the portion of the navigation area in the current view to provide context to the position of the scrollable desktop in the current view. For example, a particular instance of a word processing document may be the one in view, and the navigation key may show an outline around that particular instance.

Figure 2:
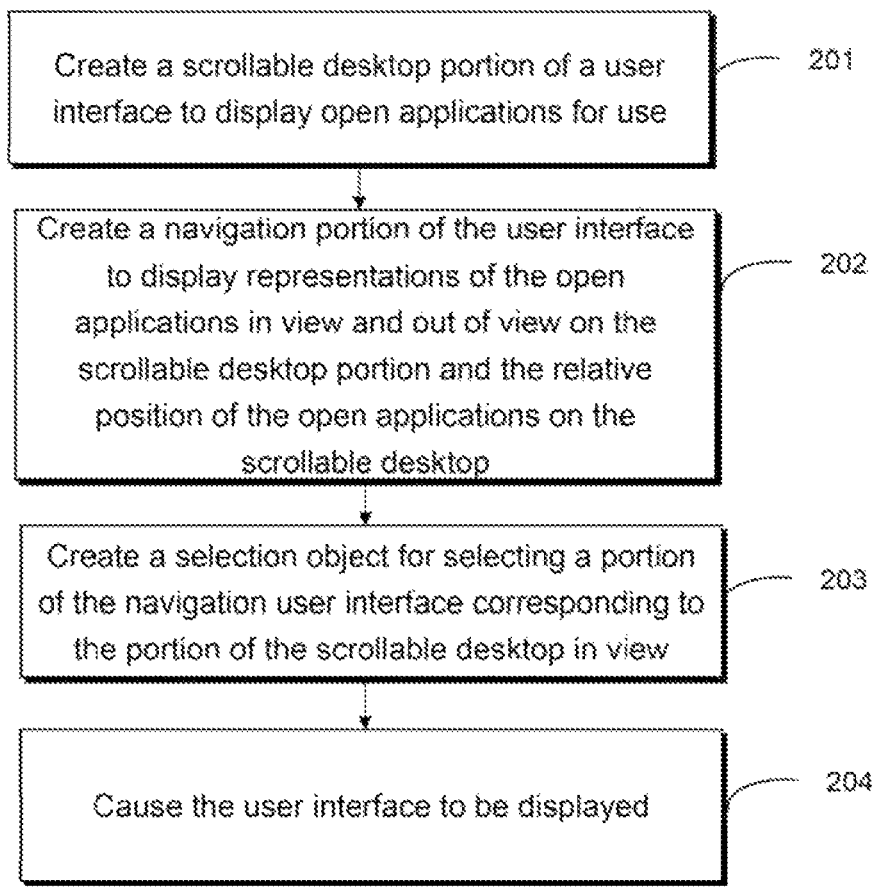
FIG. 2 is a flow chart 200 illustrating one example of a method to create a user interface with a scrollable desktop and a navigation key.

FIG. 2 is a flow chart 200 illustrating one example of a method to create a user interface with a scrollable desktop and a navigation key. For example, a scrollable desktop may allow for a desktop to be larger than a display device such that some items may be out of view, and a user may scroll to other portions of the desktop not in the current view. A navigation key may provide a key for navigating the scrollable desktop. For example, the navigation key may be a smaller version of the scrollable desktop showing the scrollable desktop as if it were unwrapped or fully in view. The navigation key may allow the user to see other open applications not in the current view of the scrollable desktop and to see the position of the current view in the scrollable desktop. The method may be implemented, for example, by the electronic device 100 from FIG. 1.

Beginning at 201, a processor, such as the processor 104, creates a scrollable desktop portion of a user interface to display open applications for use. The scrollable desktop portion may be a desktop user interface displayed on a display device. For example, the desktop user interface may be a default or background user interface. The desktop user interface may be initially displayed, and a user may access applications from the desktop user interface, such as by selecting shortcuts or menu items. The open applications may be any suitable applications available on the electronic device. As an example, the current view may have a word processing application open, and a user may scroll to another portion of the desktop to access an email application to send an email.

The scrollable desktop may allow the desktop user interface to extend beyond the dimensions of a display device. For example, a portion of the scrollable desktop may be hidden from view and may be accessed by scrolling to the position of the hidden items on the scrollable desktop. When a user opens a new application, it may be displayed on the scrollable desktop. In some implementations, the user may move or resize an open application on the scrollable desktop. The user may scroll between applications to access different applications. For example, the scrollable desktop may include a word processing document and web browser each open and ready for use such that a user may scroll between them. A user may then resize them smaller such that they both show up on a display simultaneously without scrolling between them.

Moving to 202, the processor creates a navigation portion of the user interface to display representations of the open applications in view and out of view on the scrollable desktop portion and the relative position of the open applications on the scrollable desktop. The navigation portion may, for example, show a non-scrollable version of the scrollable desktop such that in some cases the entire scrollable desktop may be in view. When a user opens a new application on the scrollable desktop, a representation of the application may appear on the navigation portion in the same relative position and relative size as on the scrollable desktop. When a user closes an application on the scrollable desktop, the application may disappear from the navigation portion. The representations may be any suitable representations of the open applications. For example, they may appear as smaller versions of the open applications that provide a user with a view of the open applications currently in view and a peak of the open applications out of view.

A processor may determine the layout of the navigation portion in any suitable manner. The layout may be determined, for example, based on the size of the navigation portion. A user may set the size of the navigation portion, or the size may be based on the size of a display device for displaying the navigation portion. In one implementation, the processor determines the size of the visual representations of open applications based on the number of open applications such that the open application representations fit on the available space on the navigation portion. For example, the visual representations may appear larger where the amount of space in use on the scrollable desktop is smaller. The navigation portion may be resized by a user to make the visual representations larger or smaller. The relative size and position of the visual representations may remain constant to reflect the relative sizes and positions on the scrollable desktop portion.

The navigation portion may be in any suitable position on a user interface. For example, the navigation portion may display the scrollable desktop in a horizontal or vertical manner. The navigation portion may appear on the top, bottom, or other position of a display screen. In one implementation, the navigation portion may be positioned based on user input. For example, a user may select a setting indicating where the navigation should appear, or a user may move the navigation portion, such as by selecting it with a mouse and moving it. In some implementations, a user may select to show or hide the navigation portion, or may select to pin the navigation portion in a particular position.

In one implementation, the representations of open applications on the navigation portion include live images of the open applications from the scrollable desktop. For example, an open application of a web browser showing a sports game may have a visual representation showing live updates of the sports game. The live images may allow the user to see the contents of open applications that are not in the current view of the scrollable desktop.

Continuing to 203, the processor creates a selection object for selecting a portion of the navigation user interface corresponding to the portion of the scrollable desktop in view. For example, the navigation portion may include a box, outline, highlight, or other item indicating a selection of the portion of the scrollable desktop in the current view. The selection object may be helpful, for example, where the same type of open application is open on different portions of the scrollable desktop. The selection object may allow a user to orient the current scrollable desktop view within the scrollable desktop.

Proceeding 204, the processor causes the user interface to be displayed. For example, the user interface may be displayed on a monitor, screen, or other display device. A user may interact with the user interface, and the user interface may be updated in response. For example, a user may move the selection object, and the scrollable desktop automatically scrolls to bring the highlighted portion within the selection object into view. In one implementation, the selection object automatically moves in response to scrolling of the scrollable desktop.

Figure 3A:
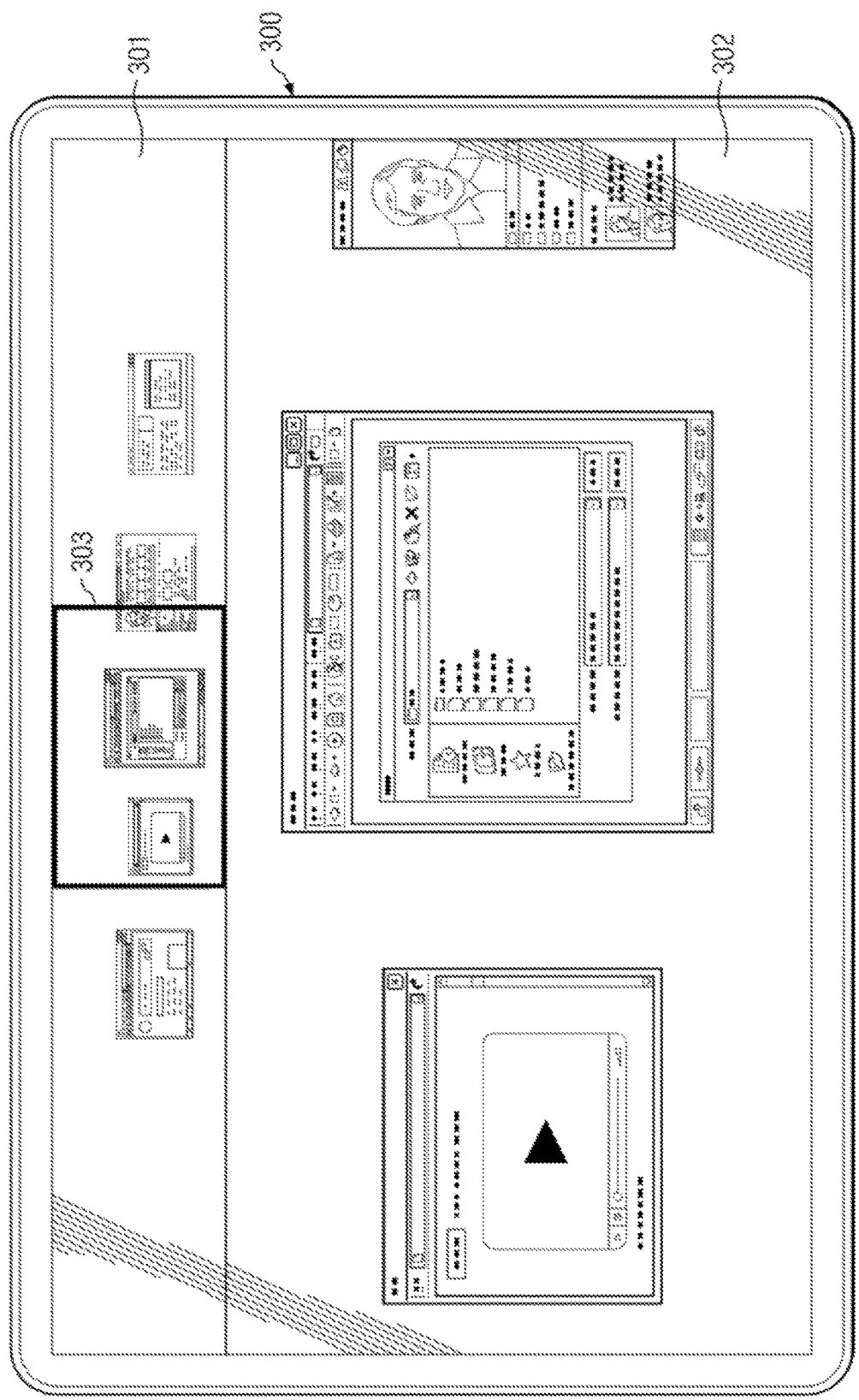
FIGS. 3A and 3B are diagrams illustrating one example of a scrollable desktop with a navigation key.
Figure 3B:
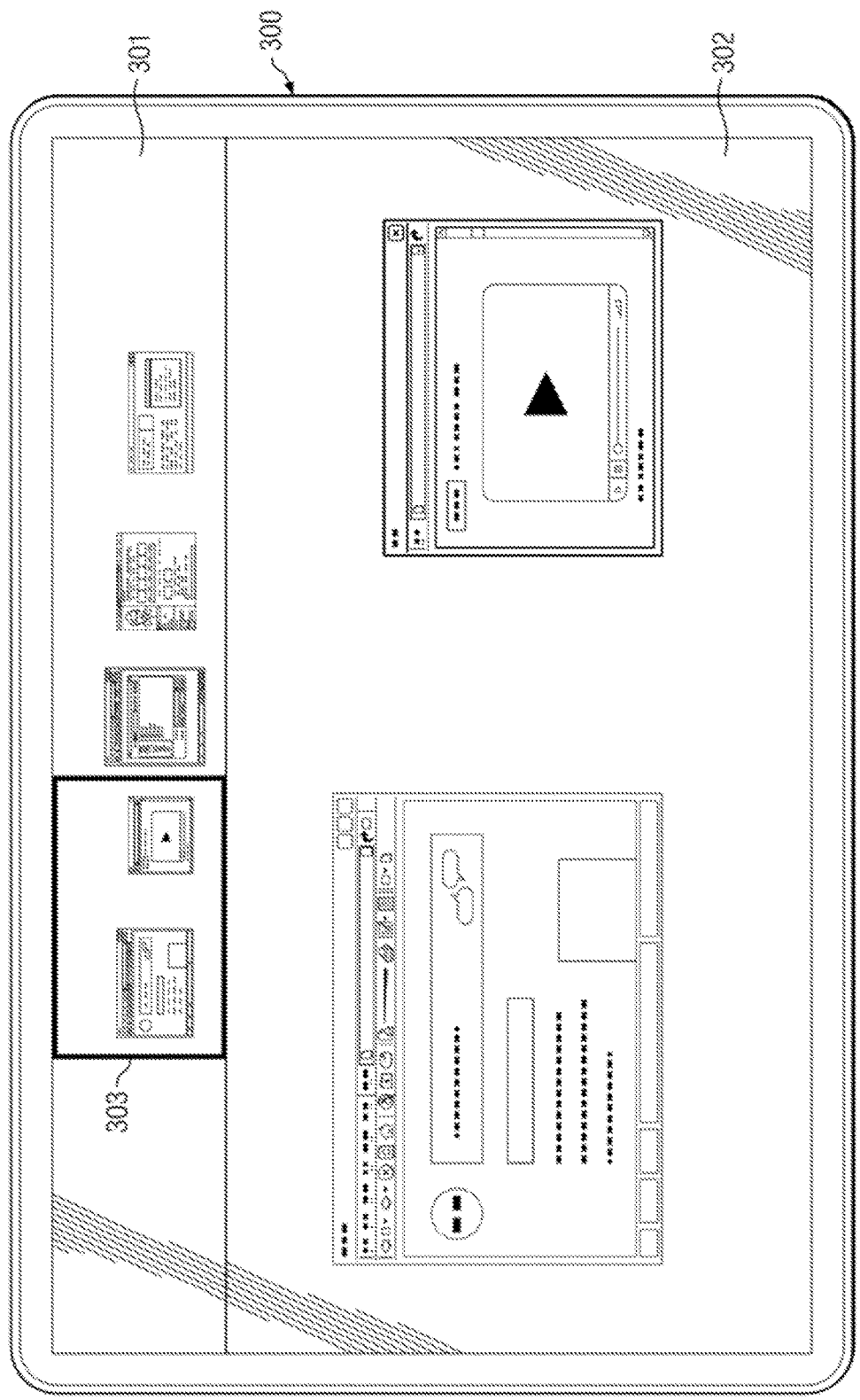

FIGS. 3A and 3B are diagrams illustrating one example of a scrollable desktop with a navigation key. FIG. 3A shows an electronic device 300 with a navigation portion 301 of a user interface and a scrollable desktop portion 302 of a user interface. The scrollable desktop portion 382 is a scrollable desktop with two open applications in the current view and a portion of another open application in view. The navigation portion 301 shows representations of the open applications in the current view and the open applications that a user may scroll to in the scrollable desktop portion 302.

The selection area 303 of the navigation portion 301 shows the part of the scrollable desktop displayed in the scrollable desktop portion 302. For example, the navigation portion 301 shows five open applications. A user may scroll across the scrollable desktop portion 302 to view the different open applications, and a user may begin using the open applications in the scrollable desktop portion 302. For example, a user may resize an open application for use, or may use the application in a smaller size where other open applications are also simultaneously in view on the scrollable desktop portion 302. The relative size and position of the open applications on the scrollable desktop portion 302 may be reflected in the navigation portion 302. The selection area 303 includes a box around the three open applications in the current view of the scrollable desktop portion. The scrollable desktop portion 302 may be scrolled in such a manner that part of an open application is in view and the remaining part is not in view because the selection area 303 may reflect a position on the scrollable desktop portion 302 in addition to the particular open applications in view.

FIG. 3B shows the electronic device 300 with the selection area 303 included over a different area of the navigation portion 301 because of the updated view on the scrollable desktop portion 302. For example, a user may scroll the scrollable desktop 302, and the selection area 303 may automatically be moved in response. The selection area 303 may orient the user to the new position in the scrollable desktop. In one implementation, a user may move the selection area 303, and the scrollable desktop portion 302 automatically scrolls to show the portion within the selection area 303. FIG. 3B shows the scrollable desktop portion 302 after a user has scrolled to the left to bring different open applications in view. The two open applications in view on the scrollable desktop portion 302 are selected in the selection area 303 on the navigation portion 301.

Figure 4A:
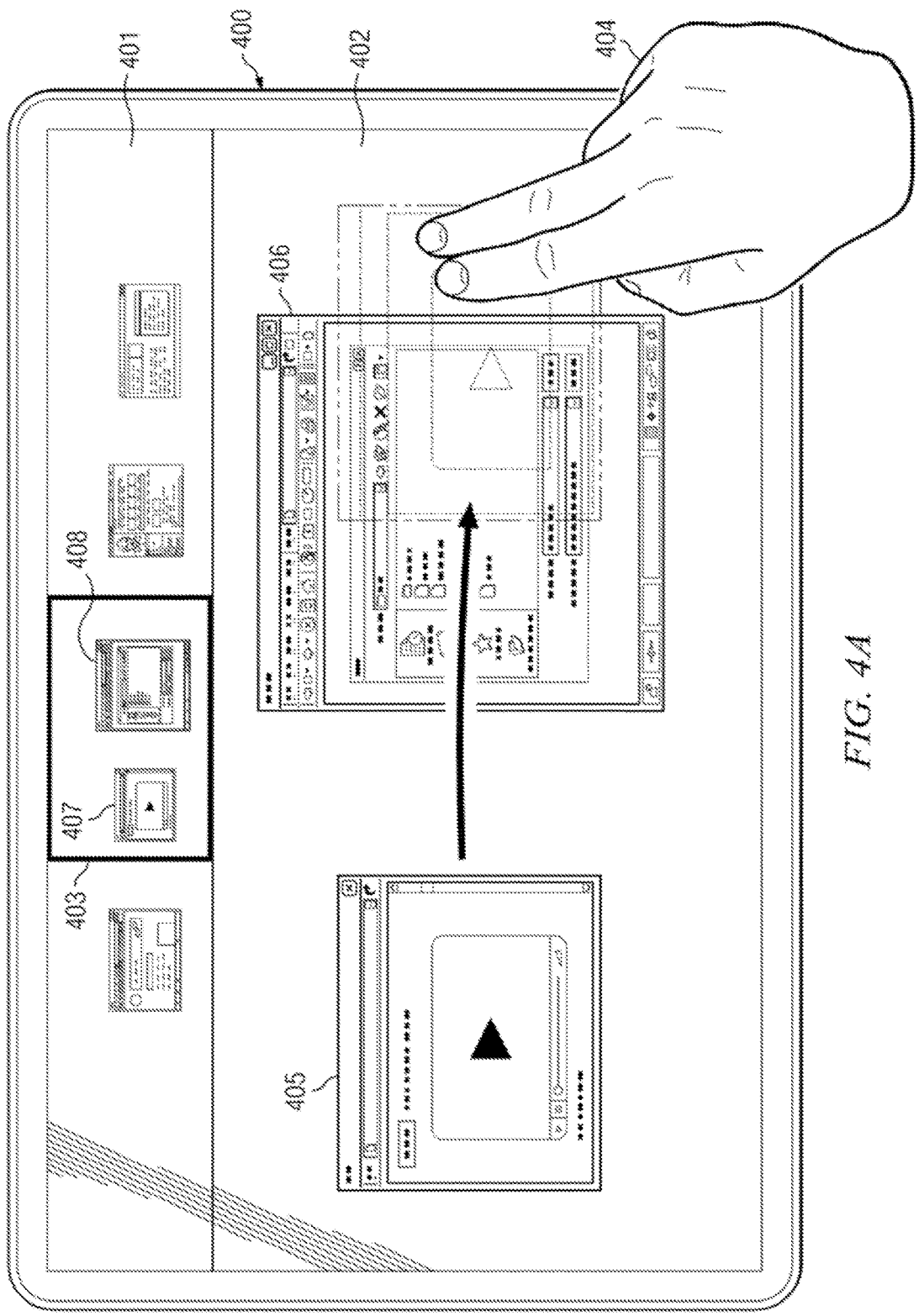
FIGS. 4A and 4B are diagrams illustrating one example of altering a user interface with a scrollable desktop and navigation key.
Figure 4B:
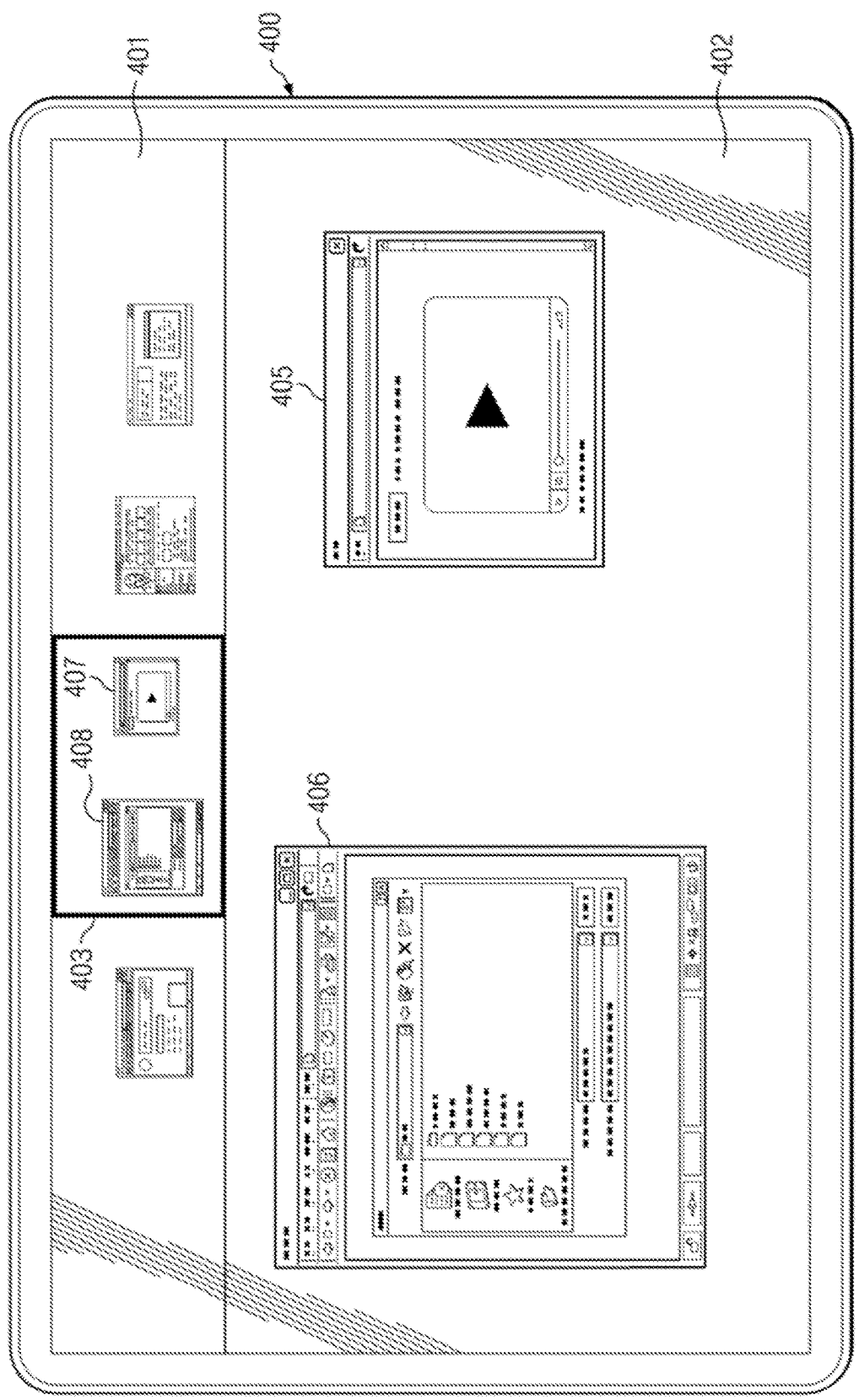

FIGS. 4A and 4B are diagrams illustrating one example of altering a user interface with a scrollable desktop and navigation key. FIG. 4A shows an electronic device 400 with a navigation portion 401 and a scrollable desktop portion 402. Open applications 405 and 406 are in view in the current position of the scrollable desktop portion 402. The selection area 403 shows the representation 407 of open application 405 and the representation 408 of open application 406. A user 404 moves application 405 to the right of application 406.

The navigation portion 401 may be updated to reflect the current state of the scrollable desktop portion 402. FIG. 4B shows the updated selection area 403 of the navigation portion 401 reflecting the new view of the scrollable desktop portion 402, including the new order of the open applications 405 and 406. For example, representation 407 is shown to the right of representation 408.

Figure 5A:
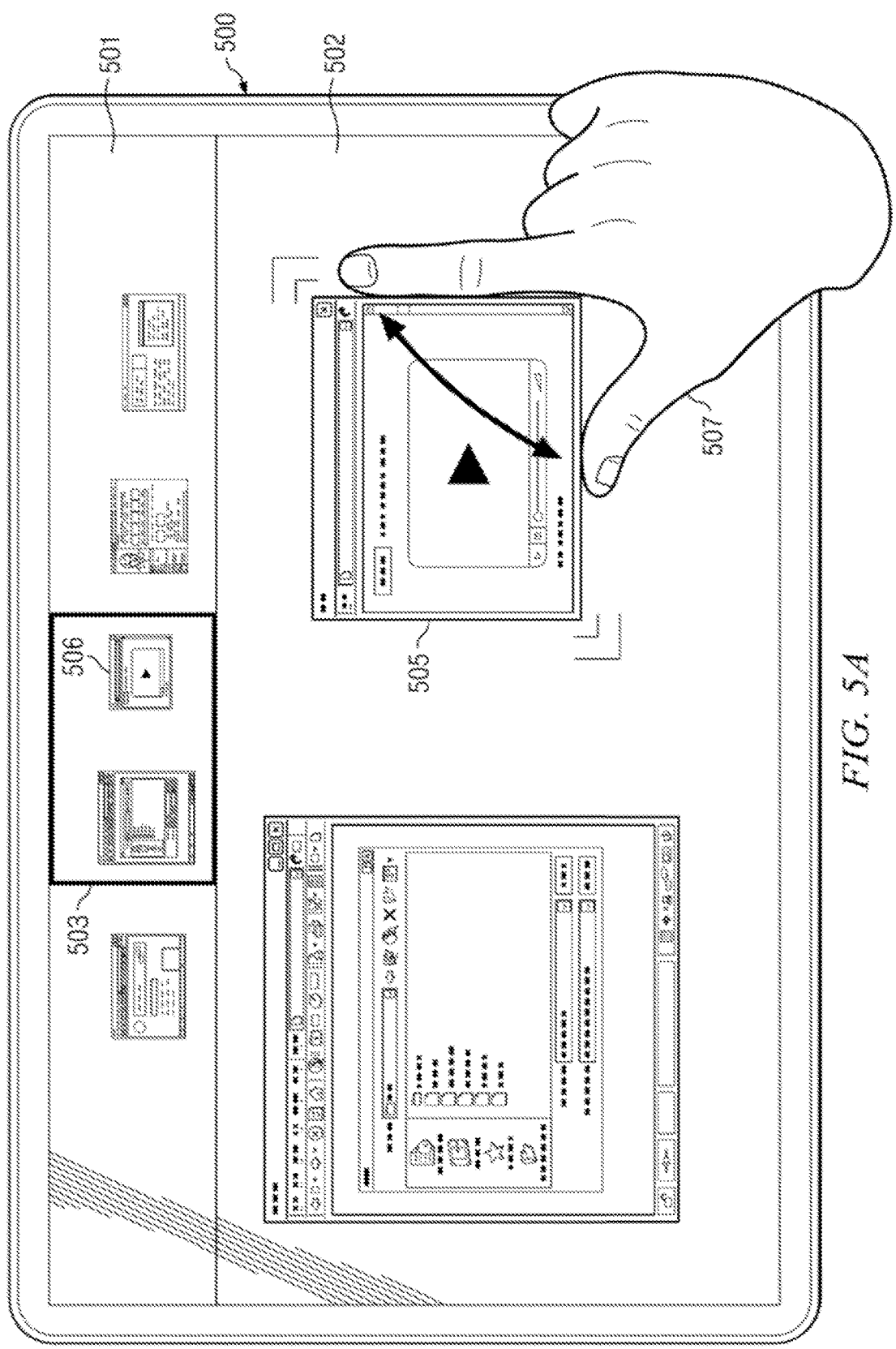
FIGS. 5A and 5B are diagrams illustrating one example of resizing an open application in a user interface with a scrollable desktop and navigation key.
Figure 5B:
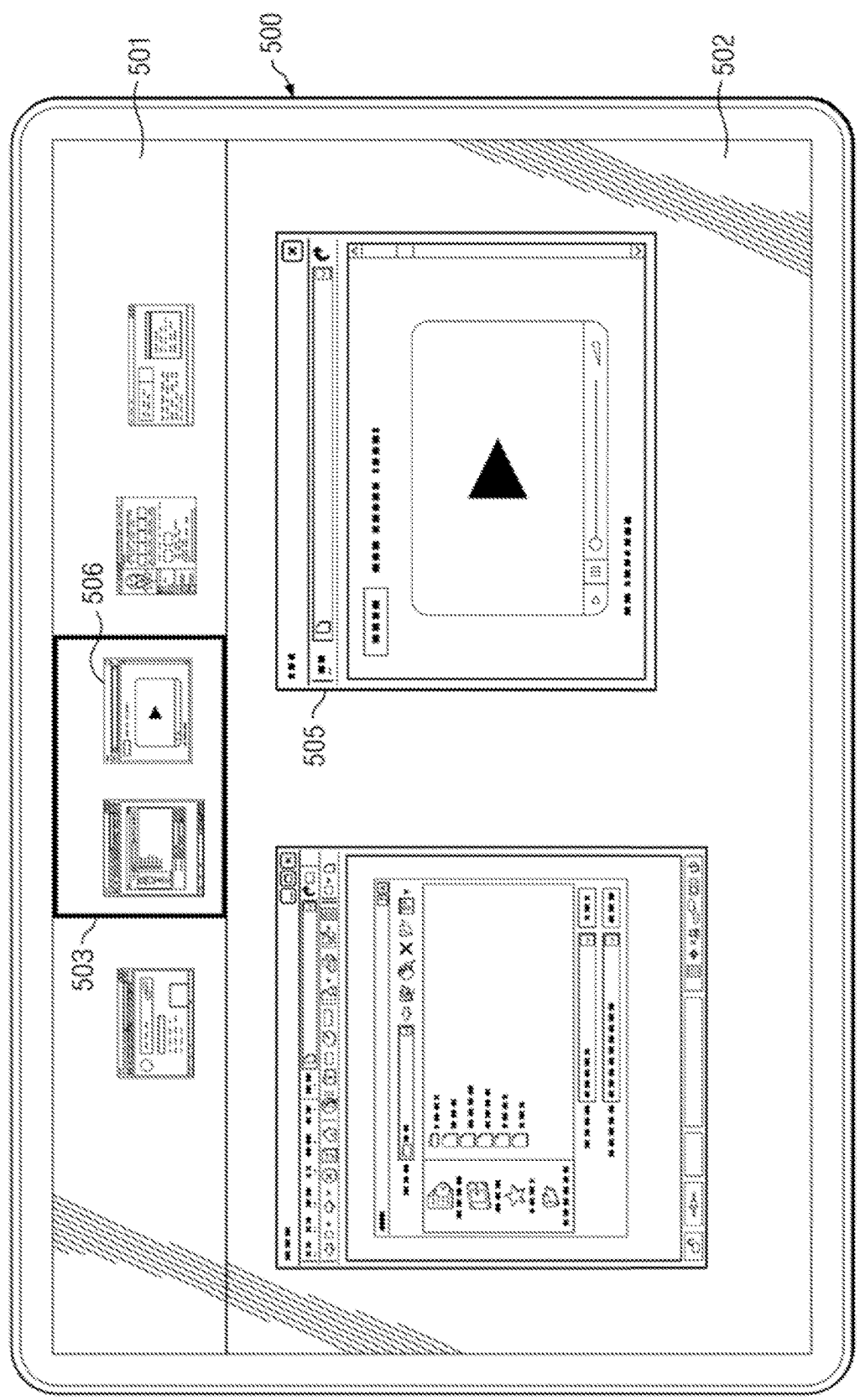

FIGS. 5A and 5B are diagrams illustrating one example of resizing an open application in a user interface with a scrollable desktop and navigation key. FIG. 5A shows an electronic device 500 with a user interface with a navigation portion 501 and a scrollable desktop portion 502. A selection area 503 shows the area of the navigation portion 501 in view in the scrollable desktop portion 502. A user 507 resizes the open application 505, also shown as the representation 506 in the navigation portion 501, to make it appear larger.

FIG. 5B shows the open application 505 resized in the scrollable desktop portion 502 and the representation 506 resized in the navigation portion 501. In some implementations, the open application representations in the navigation portion 501 may be resized based on the number or size of icons. The relative sizes may be the same even as the size changes. The representations on the navigation portion 501 may also be resized in response to a change in size of the navigation portion 501. The representations may be resized to maintain the reflection of the relative size and position of the open applications on the scrollable desktop portion 502.

Figure 6:
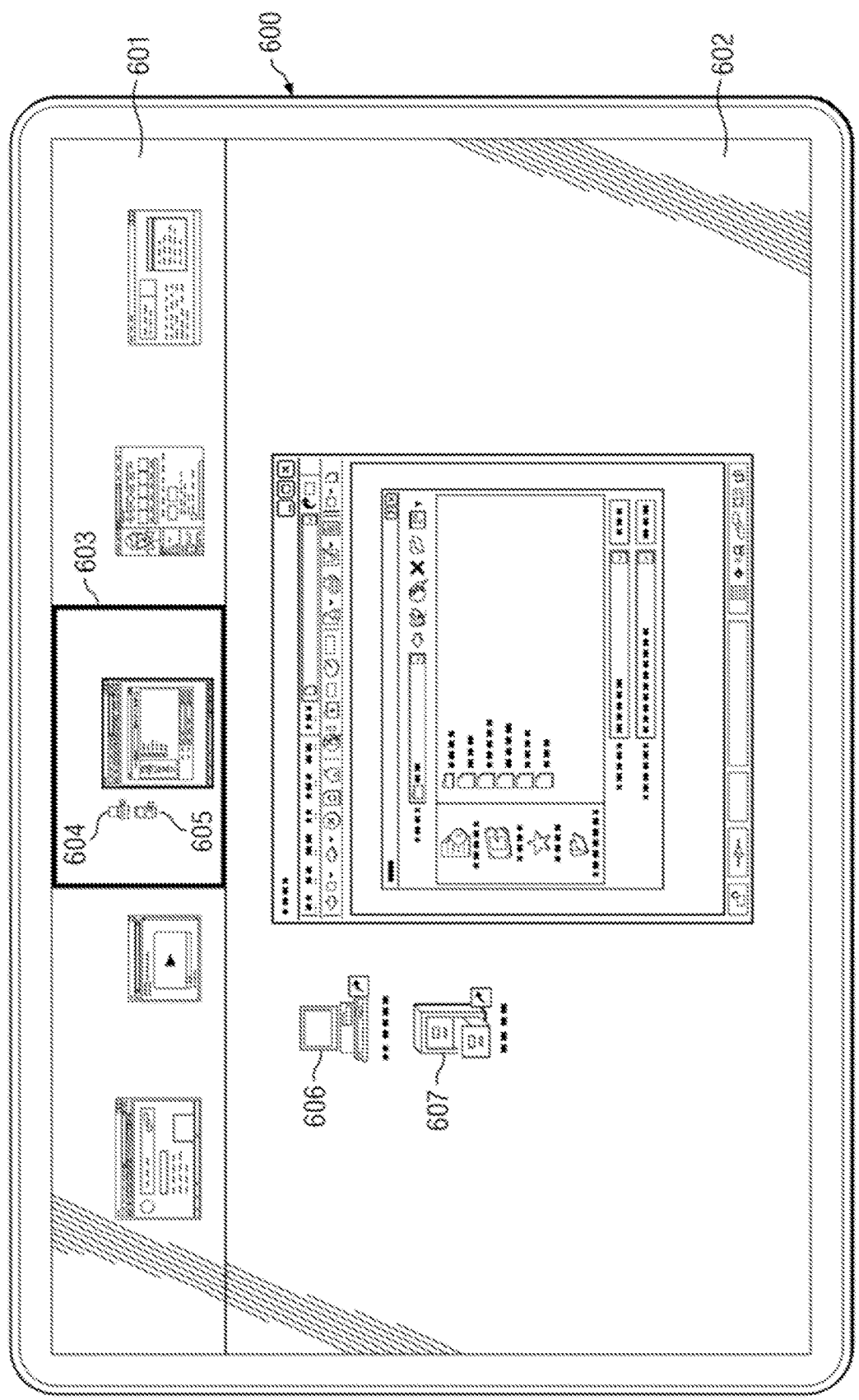
FIG. 6 is a diagram illustrating one example of a user interface with a scrollable desktop and navigation key where the navigation key includes desktop icons.

FIG. 6 is a diagram illustrating one example of a user interface with a scrollable desktop and navigation key where the navigation key includes desktop icons. For example, the scrollable desktop portion 602 includes icons 606 and 607. The icons may be any suitable icons that may be on a desktop user interface. For example, they may be a short cut to a particular folder, document, or program. The icons 606 and 607 may remain in the same position even as the scrollable desktop is scrolled. For example, access to the icons 606 and 607 may remain when the scrollable desktop portion 602 is scrolled to a different position. The icons may be shown in the navigation portion 601. The icon 606 may be associated with the icon representation 604, and the icon 607 may be associated with the icon representation 605. The icon representations 604 and 605 may be shown in a selection area 603 of the navigation portion 601 to orient the user as to the position of the open applications relative to the icons.

A scrollable desktop with a navigation portion may provide a user with information about options out of view on the scrollable desktop. The navigation portion may also orient a user to the current position displayed on the scrollable desktop. The navigation portion may allow the scrollable desktop to provide a better user experience due to the increased size of the desktop user interface.

The invention claimed is:

1. An apparatus, comprising:
a display; and
a processor to:
create a user interface including a scrollable desktop area and a navigation key of the scrollable desktop area, wherein the scrollable desktop area includes multiple portions to display open applications, wherein only a first portion of the multiple portions of the scrollable desktop is in view on the display, wherein the first portion includes a first open application and a second open application, wherein the navigation key includes representations of the open applications on the scrollable desktop area indicating the relative position of the open applications on the scrollable desktop area;

render a movable selection area on a portion of the navigation key to highlight on the navigation key the first portion of the scrollable desktop area shown in the current view on the display, the movable selection area including representations of the first and second open applications;

in response to a user input, resize the first open application in the scrollable desktop area;

in response to a change in size of the first open application in the scrollable desktop area, resize, in the movable selection area on the portion of the navigation key, only the representation of the first open application; and cause the user interface to be displayed on the display.

2. The apparatus of claim 1, where the user input is a touch gesture received in the scrollable desktop area.

3. The apparatus of claim 1, wherein the open application representations in the movable selection area comprise live images of the first and second open applications on the scrollable desktop.

4. The apparatus of claim 1, wherein the processor further scrolls the scrollable desktop area to show the portion of the scrollable desktop area highlighted within the movable selection area on the navigation key.

5. The apparatus of claim 1, wherein the first portion of the scrollable desktop includes desktop shortcut icon, and the movable selection area of the navigation key includes a representation of a desktop shortcut icon.

6. A method, comprising:
creating a scrollable desktop area of a user interface, the scrollable desktop area including multiple portions to display open applications for use, wherein only a first portion of the multiple portions of the scrollable desktop is in view on a display device, wherein the first portion includes a first open application and a second open application;

creating a navigation area of the user interface to display representations of the open applications in view and out of view on the scrollable desktop area and the relative position of the open applications on the scrollable desktop area;

creating a selection area object for selecting a portion of the navigation area corresponding to the first portion of the scrollable desktop area, the selection area object including representations of the first and second open applications;

in response to a user input, resizing the first open application in the scrollable desktop area;

in response to a change in a size of the first open application in the scrollable desktop area, resizing, in the selection area object of the navigation area, only a representation of the first open application; and causing the user interface to be displayed.

7. The method of claim 6, further comprising providing an option to:
move the navigation area of the user interface; and
hide the navigation area of the user interface.

8. The method of claim 6, wherein moving the selection area object is to change the portion of the scrollable desktop in view on the scrollable desktop area.

9. The method of claim 6, further comprising adding an open application representation to the navigation area of the user interface when a new application is opened.

10. The method of claim 6, further comprising rearranging the order of the open applications on the scrollable desktop area where the order of the open application representations is rearranged on the navigation area.

11. The method of claim 6, further comprising rearranging the order of the open application representations on the navigation area of the user interface where the order of the open applications is rearranged on the scrollable desktop area.

12. The method of claim 6, wherein the first portion of the scrollable desktop includes desktop shortcut icon, and the selection area object of the navigation key includes a representation of a desktop shortcut icon.

13. A machine-readable non-transitory storage medium including instructions executable by a processor to:
create a scrollable desktop including multiple portions to display open applications for use, wherein the scrollable desktop allows an open application to be out of view on a display device, wherein only a first portion of the multiple portions of the scrollable desktop is in view on the display device, wherein the first portion includes a first open application and a second open application;

create a navigation key comprising representations of the open applications in the scrollable desktop;

create a selection area object for selecting a portion of the navigation area corresponding to the first portion of the scrollable desktop area, the selection area object including representations of the first and second open applications;

in response to a user input, resize the first open application in the scrollable desktop;

in response to a change in a size of the first open application in the scrollable desktop, resize, in the selection area object of the navigation key, only a representation of the first open application; and cause the scrollable desktop, the navigation key, and the selection object to be displayed.

14. The machine-readable storage medium of claim 13, further comprising instructions to automatically scroll the scrollable desktop to bring the portion within the selection object into view.

15. The machine-readable storage medium of claim 13, further comprising instructions to determine the size of the representations of the open applications in the navigation key based on the size of the scrollable desktop.

16. The machine-readable storage medium of claim 13, wherein the user input is a touch gesture received in the scrollable desktop.

17. The machine-readable storage medium of claim 13, wherein the first portion of the scrollable desktop includes desktop shortcut icon, and the selection area object of the navigation key includes a representation of a desktop shortcut icon.

* * * * *